United States Patent [19]
Pettesch

[11] Patent Number: 6,142,167
[45] Date of Patent: Nov. 7, 2000

[54] TANKER ROLL SHUT-OFF VENT VALVE ASSEMBLY

[75] Inventor: Martin C. Pettesch, Cranford, N.J.

[73] Assignee: Technalink, Inc.

[21] Appl. No.: 09/259,961

[22] Filed: Mar. 1, 1999

[51] Int. Cl.$^7$ .............................. F16K 17/19; F16K 17/36
[52] U.S. Cl. ................................ 137/39; 137/43; 137/45; 137/493.4; 137/493.8
[58] Field of Search .................................. 137/39, 43, 45, 137/493.4, 493.8

[56] References Cited

U.S. PATENT DOCUMENTS

| | | | |
|---|---|---|---|
| 4,593,711 | 6/1986 | Morris | 137/39 |
| 4,694,847 | 9/1987 | Szlaga | 137/39 |
| 4,709,901 | 12/1987 | Pierson et al. | 251/58 |
| 4,934,403 | 6/1990 | Mooney et al. | 137/315 |
| 5,135,024 | 8/1992 | LeBlanc et al. | 137/529 |
| 5,261,450 | 11/1993 | Betts | 137/514.7 |
| 5,460,197 | 10/1995 | Kerger et al. | 137/39 |

OTHER PUBLICATIONS

Tiona® PPV Pressure Vacuum Vent for MC 306 Tank Vehicles, not dated,Betts Industries, Warren, Pennsylvania, Product Sheet (Front and Back).

*Primary Examiner*—Stephen M. Hepperle
*Attorney, Agent, or Firm*—Edward Dreyfus

[57] ABSTRACT

A vent valve assembly with roll over shut-off capability includes a housing, a vent valve that opens to allow vapor to escape from the tank in response to tank vapor pressure greater than a predetermined positive pressure and that opens to allow air or vapor entrance to the tank in response to tank vapor pressure below a predetermined negative pressure. A roll over valve is provided to open and close the fluid flow path between the vent valve and the tank interior, and a rocker arm assembly is rotatably mounted to the housing for positioning the roll over valve in the open position when the tanker is upright and for moving the roll over valve to the closed position when the tanker rolls more than a predetermined angle relative to the upright position. Stored liquid rising above the shut-off valve applies a further force closing the shut-off valve in relation to the head pressure. In one example, the roll over valve is a poppet type mounted below the vent valve assembly, the rocker arm is weighted below the rocker arm pivot, and the rocker arm includes a cam that forces the poppet upward to close in response to tank roll over.

19 Claims, 4 Drawing Sheets

TANKER ROLL SHUT-OFF VENT VALVE ASSEMBLY

BACKGROUND

The present invention relates to fueling tanker truck vapor vent valve assemblies and more particularly to those assemblies with automatic liquid shut-off in response to tank truck roll over.

Fueling tanker trucks are typically constructed as an elongated, horizontal tank having a number of internally divided compartments with various unequal volume capacities to store and transport gasoline, fuel oil, aircraft fuels, or other volatile liquids and fuels. Gasoline tankers are typically bottom loaded through load only or load/unload couplers located below the tanker undercarriage. Vapor rails, channels, or trunks extending along the inside top of the tank include pressure valves tending to generally equalize the vapor pressure at the top of each compartment.

Normally one or more tanker compartments are provided with a large manhole or hatch at the top of the tank. The manhole is covered by a hinged hatch cover which must be sealed liquid tight when closed. Gaskets and other devices are provided for this purpose. One or more of the hatch covers or the upper tank wall itself mounts a vapor pressure relief valve or vent valve operable to allow the escape of vapors from the top of a tank compartment to the atmosphere when excessive pressure builds above a predetermined PSI, such as 3.5 psi or other design parameter. The vent valve also enables the intake of air to relieve predetermined excessive vacuum or negative PSI at the tank top, such as minus 6 ounces PSI. These positive and negative psi conditions normally appear during loading, unloading, a rise in tank temperature or a decline in tank temperature. Unsealed weather caps usually cover the vent valves to prevent rain, snow, or other environmental access to the top of the vent valve. See, for example, "Bottom Loading and Vapor Recovery for MC-306 Tank Motor Vehicles", U.S. Transportation Department, API Recommended Practice 1004, Seventh Edition, November 1988, published by the American Petroleum Institute, incorporated herein by reference.

Because tankers can roll over under certain driving conditions, the vent valves can be a source of stored liquid spills creating a very dangerous situation or damage to the environment. Spills through the vent valve have occurred because of the positive liquid pressure head exerted against the vent valve when the tanker rolls to a degree that places the hatch cover below the liquid level.

Attempts have been made to avoid vent valve spills by relying only on the weight of an axial member to seal against liquid pressure. See Betts Industries Inc., Part No. 6238AL, PPV Pressure Vacuum Vent For MC 306 Tank Vehicles.

OBJECTS OF THE INVENTION

Objects of the invention include providing a liquid storage tank normally oriented in an upright position and being capable of rolling over through an angle greater than an angle at which liquid stored the tank can contact the top of the tank interior. The tank includes a venting and roll over shut-off valve assembly mounted at or near the top of the tank that includes a passageway communicating between the tank interior and tank exterior and a vent valve subassembly which when in a normally closed position blocks air or vapor communication through said passageway and which moves to at least one open position in response to the tank vapor pressure and exterior tank atmospheric pressure being greater than a predetermined absolute value to permit air or vapor communication through said passageway, and a roll over shut-off valve preventing stored liquid from entering said passageway when the tank rolls more than a predetermined angle from the upright position.

The shut-off valve assembly includes a shut-off valve moveable between a fully open and fully closed position and toward and away from said passageway, and if stored liquid contacts the shut-off valve when in the closed position the liquid can apply a further closing force to said shut-off valve in relation to the stored liquid head pressure above the shut-off valve.

The assembly further can include a housing defining the passageway. The shut-off valve assembly is arranged below the passageway and the subassembly. The shut-off valve assembly includes a shut-off valve moveable between a fully open and fully closed position and toward and away from said passageway, and a rocker arm mounted to said housing for rotation in the tank roll direction between a normal upright open position and a fully closed angular position. The rocker arm can have a top portion above the rotation axis for moving said shut-off valve in response to the angular roll of the tank in either direction away from the tank upright position. The shut-off valve rests on said rocker arm top portion with the shut-off valve in the fully open position when the tanker and housing are upright, one of the shut-off valve and top portion having a cam surface through which the rocker arm applies a closing force to move the shut-off valve toward the closing position with the passageway. The rocker arm preferably includes a weighted portion spaced below the rotation axis. The housing includes a mid-section defining the passageway and the shut-off valve preferably comprises a poppet which when closed seats against said mid-section.

The vent valve subassembly includes an outer valve that seats against the housing mid-section when in the normally closed position and that moves toward the open position in response to positive tank vapor pressure relative to the ambient being greater than the predetermined value.

The outer valve includes a body with at least one vent opening for communicating with the passageway and an inner valve movable between a normally closed position blocking vapor communication through the vent opening and an open position permitting such communication in response to vapor pressure in the tank dropping below a predetermined negative value relative to external ambient pressure. The subassembly preferably includes O-ring seals and one of said outer and inner valve seats against one of the O-ring seals respectively when in the closed position. The vent subassembly includes a spring assembly and stem for biasing the inner valve to its closed position and the vent subassembly includes a guide shaft coupled to the stem for guiding the movement of the shut-off valve between its open and closed positions.

The shut-off valve includes a guide tube for telescoping with the shaft. The outer valve includes legs for telescoping and guiding within said passageway.

SUMMARY OF EXEMPLARY EMBODIMENTS OF INVENTION

A vent valve assembly with roll over s hut-off capability in accordance with the principles of the present invention includes a housing, a vent valve that opens to allow vapor to escape from the tank in response to tank vapor pressure greater than a predetermined positive pressure and that opens to allow vapor entrance to the tank in response to tank vapor pressure greater than a predetermined negative pressure. A roll over valve is provided to open and close the fluid flow path between the vent valve and the tank interior, and a rocker arm assembly rotatably mounted to the housing for positioning the roll over valve in the open position when the tanker is upright and for moving the roll over valve to the closed position when the tanker rolls more than a predetermined degree relative to the upright position.

Additional features include:

the housing including a valve chamber to house the vent valve;

the roll over valve being a poppet type mounted for vertical movement below the chamber;

stored liquid head pressure against the shut-off valve applies additional closing force;

the rocker arm assembly mounted below the roll over valve so that the rocker arm moves the roll over valve toward the chamber when closing the roll over valve;

the rocker arm assembly includes a weighted portion on the opposite side of the pivot or rotation axis from the roll over valve;

the rocker arm assembly and roll over valve define a cam and cam surface for reducing the rate of roll over valve movement toward the closed position relative to the degree of rocker arm rotation from its vertical position.

DRAWING DESCRIPTION

Other and further objects and benefits of assemblies according to the principles of the present invention will become apparent from the following detailed description when taken in view of the appended drawings, in which.

DETAILED DESCRIPTION OF EXEMPLARY EMBODIMENT

Figure 1:
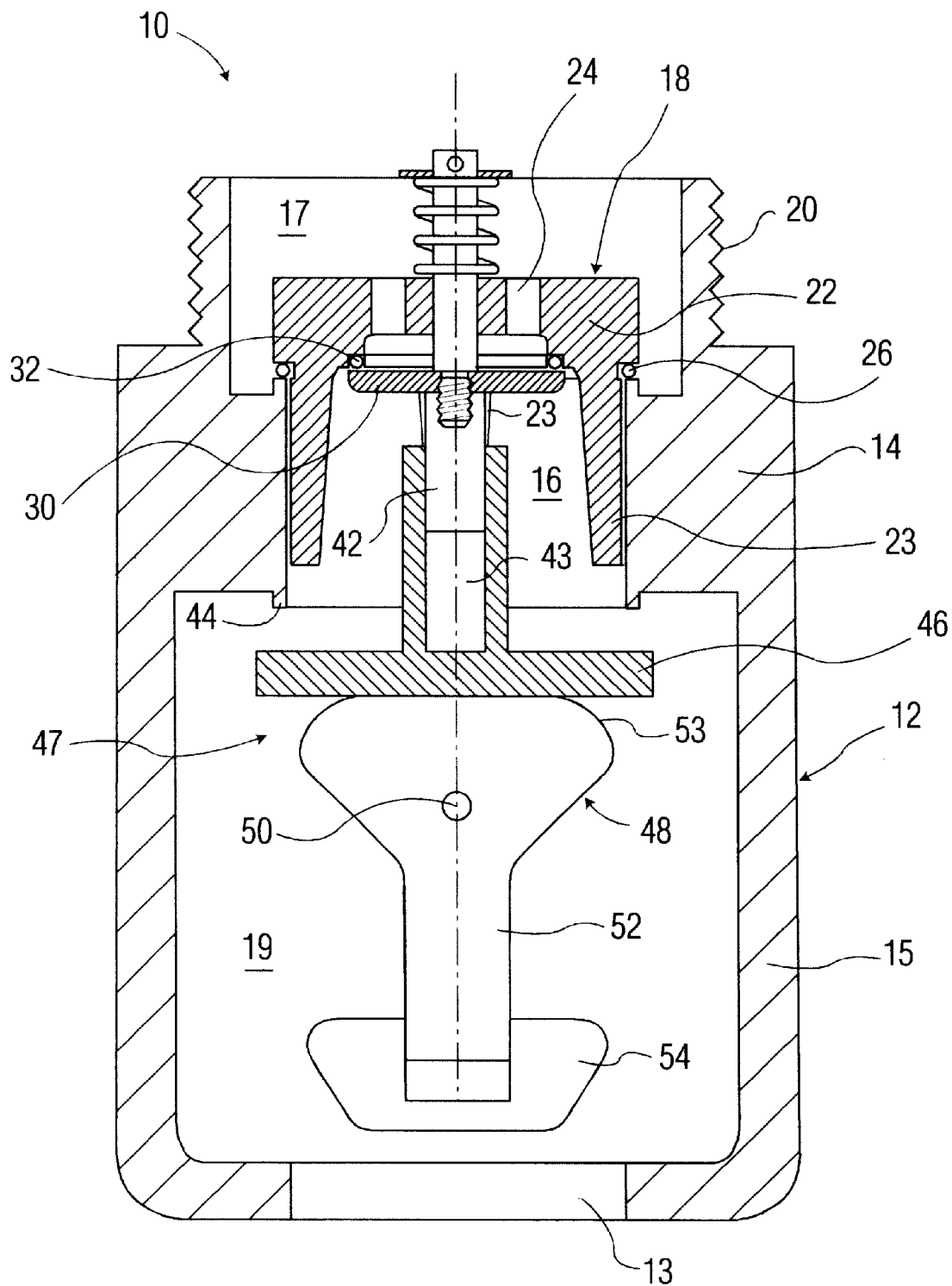
FIG. 1 is a vertical front section taken in the tanker roll plane showing the venting and roll over shut-off assembly in the upright position with the vent subassembly closed.
Figure 2:
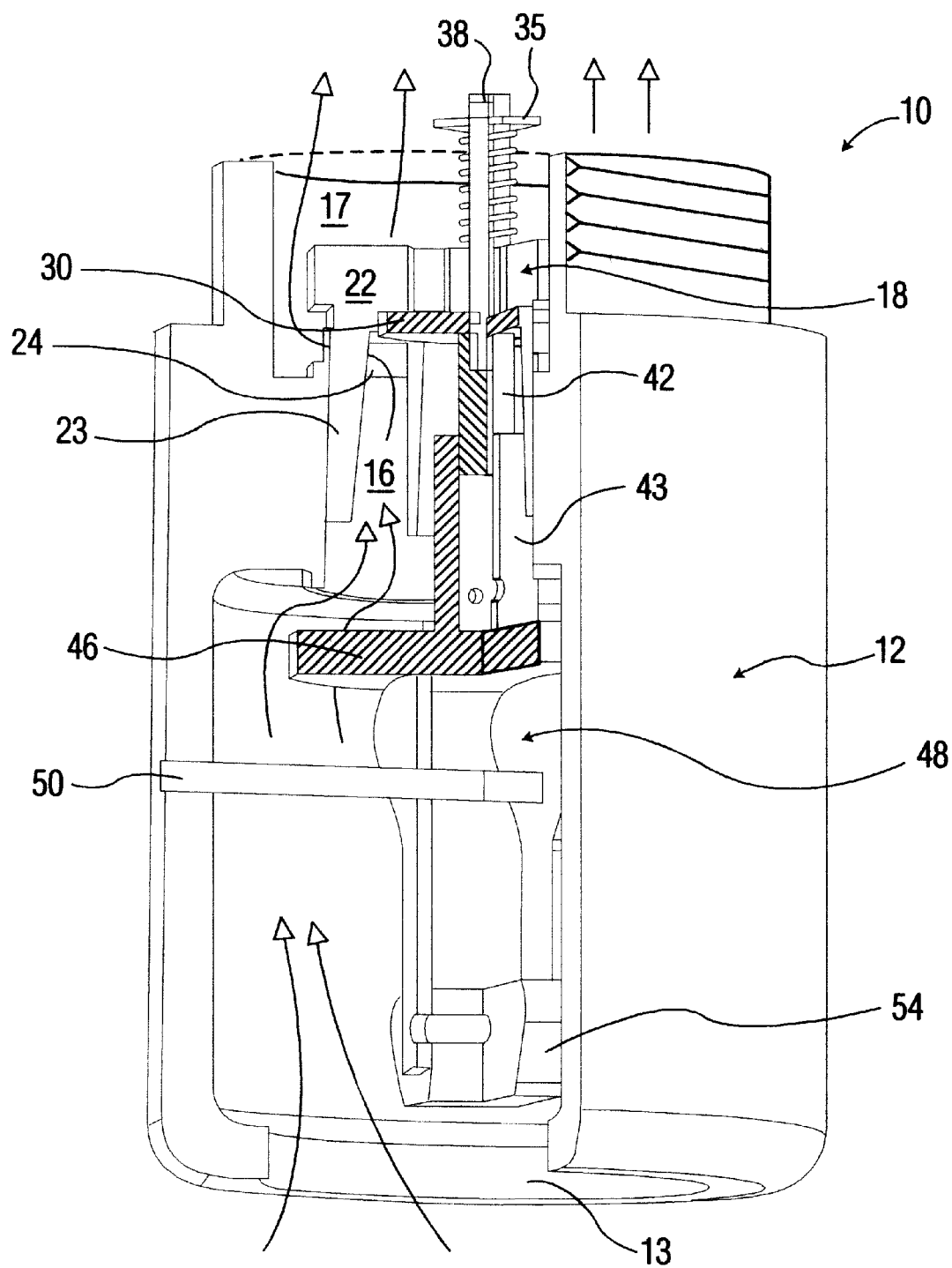
FIG. 2 is a perspective cut-a-way view of the apparatus of FIG. 1 showing positive pressure vapor flow from the tank interior to the ambient with the poppet 22 in the raised or open position.
Figure 3:
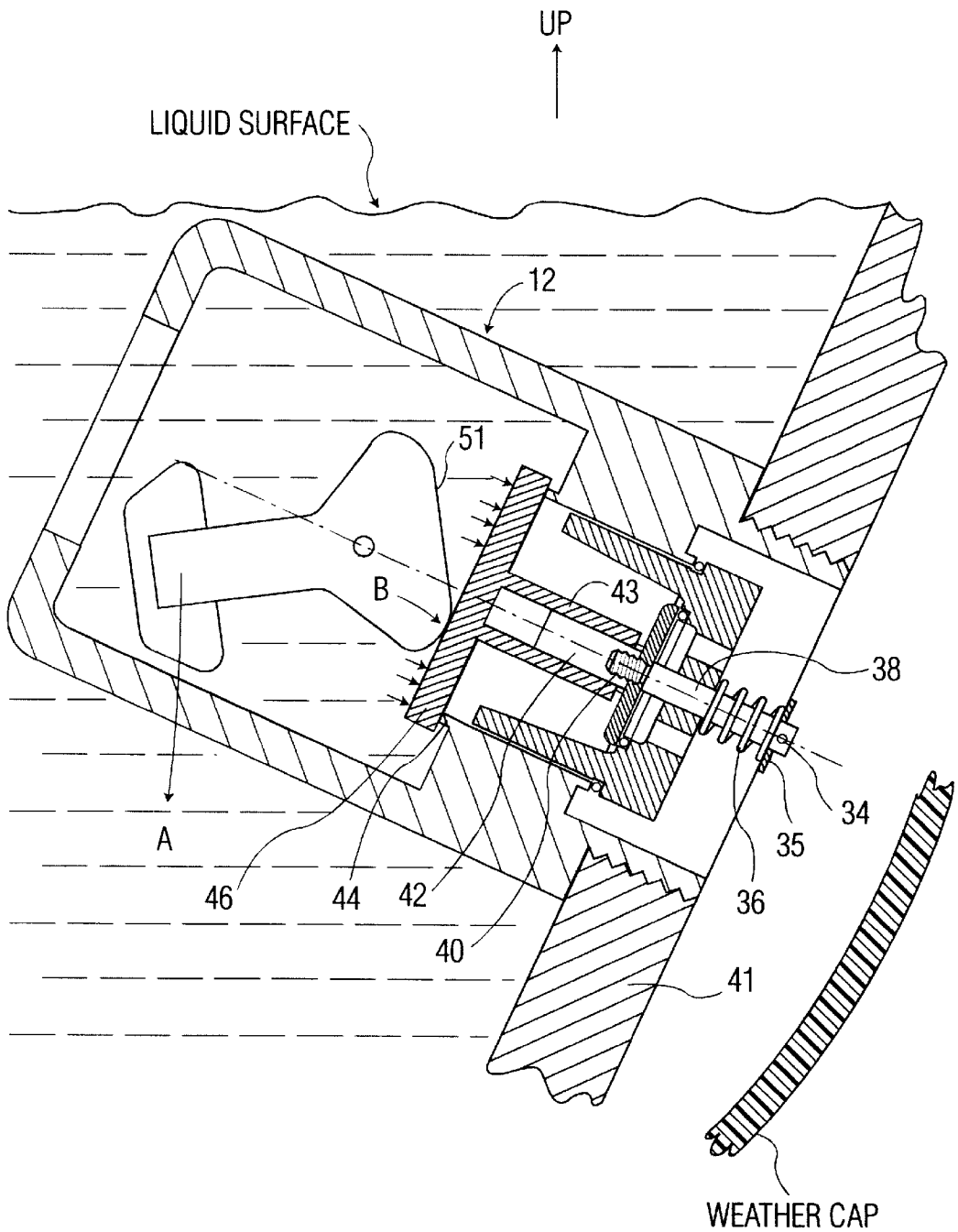
FIG. 3 is similar to FIG. 1 showing the FIG. 1 unit mounted in the tank manway hatch cover and the stored liquid all when the tanker has rolled through an angle in the clockwise direction.
Figure 4:
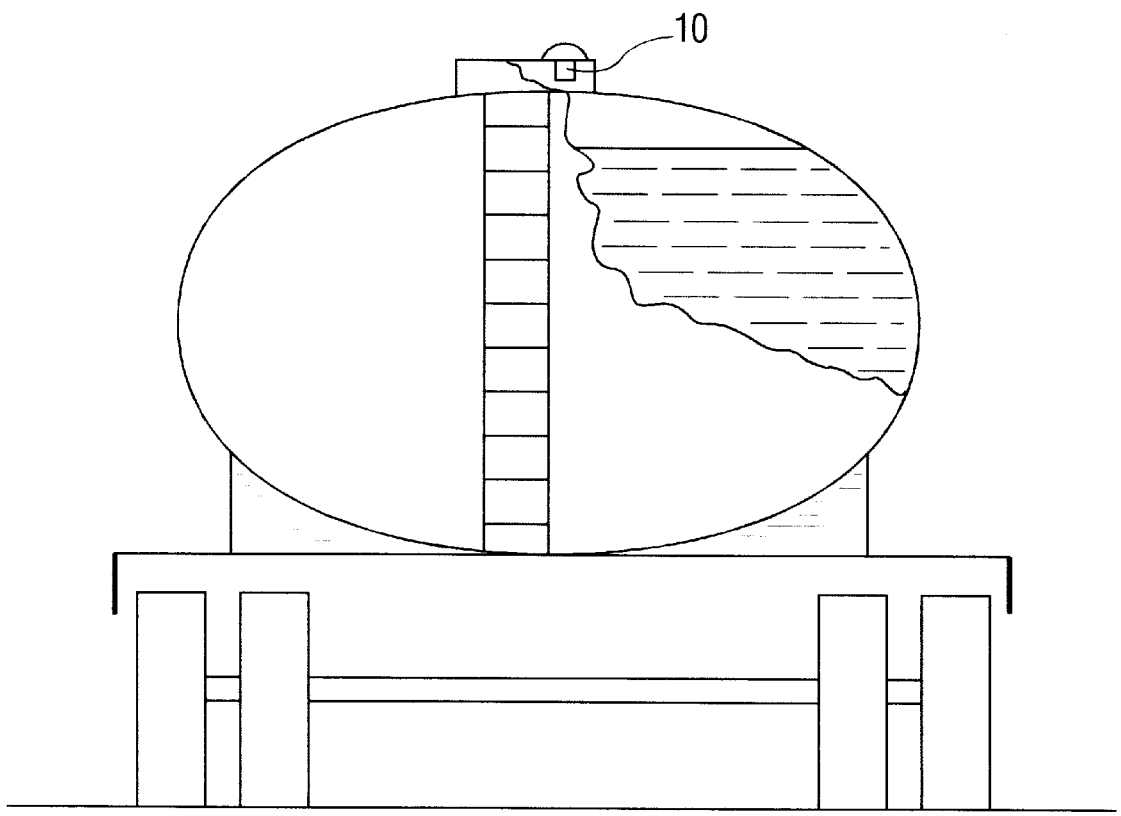
FIG. 4 is a rear pictorial view of a typical tanker truck with parts broken away to show the stored liquid in one compartment and a possible location of venting and shut-off valve 10 in the manway hatch cover.

Referring to FIGS. 1–3, an exemplary embodiment of the tanker roll over shut-off vent valve assembly 10 according to the principles of the present invention includes a housing 12 having mid-section 14 and threaded top section 20 defining vent valve lower passageway or chamber 16 and vent valve upper passageway or chamber 17, respectively. A lower housing section 15 can define a lower chamber 17 that houses rocker arm assembly 48 and roll over valve 46 further described below. The outer shape of sections 14 and 15 is round but can be four sided or any other suitable shape or combination of shapes. Chamber 17 communicates with the tank interior through opening 13 or other suitable openings, not shown. Vent valve sub-assembly 18, in this example, seats in lower and upper chamber portions to block air or vapor flow through chambers 16 and 17 when in a normally closed condition and to provide vapor or ambient air communication between the tank interior and outside atmosphere in response to positive and negative tank pressure as described below. In this example, sub-assembly 18 includes outer poppet valve 22 that include s two or more vent openings 24 for communicating with vent chamber 17 and a number, in this example, four, guide legs 23 dimensioned to position contiguous the walls of chamber 16 for vertical, guided relative movement therewith.

Assembly 18 further includes an inner poppet valve 30 that cooperates with O-ring 32 to seal chamber 28 when in the normally closed position. Poppet stem 38 terminates in a threaded end 40 that threads into poppet valve 30. Stem 38 is biased upward by spring 36 held between the top of poppet valve body 22 and washer 35 by pin 34. Although normally biased to seal against O-ring 32, it can be seen that poppet valve 30 will move downward against the force of spring 36 whenever the pressure on the internal side of valve 30 across the area of valve 30 is negatively greater than the air pressure across the outside surface of valve 30 plus the bias force of spring 36. Downward movement of stem 38 and poppet 30 permits outside air to enter the tank interior through chamber 17, vents 24, chamber 16, and the ho using opening 13. Once the internal tank pressure relative to outside pressure rises above the predetermined value, spring 36 draws stem 38 upward sealing valve 30 against O-ring 32 to seal chamber 28 from further air flow.

Body 22 further includes an O-ring seat to secure O-ring 26. Because of the weight of the vent valve sub-assembly 18, body 22 an d O-ring 26 normally seal closed against the top of mid-section 14 so that if valve 30 is closed, valve body 22 seals closed the vapor communication path through chambers 16 and 17. If the positive vapor pressure in the tank exceeds a predetermined pressure relative to the outside pressure, then the positive pressure on the underside of assembly 18 raises body 22 and the O-ring 26 above the top of mid-section 14 allowing vapor to flow from the tank interior through opening 13, chamber 16 and out chamber 17.

The mechanism of the combination serving to prevent liquid leakage from tank roll over will now be described for the example embodiment disclosed herein. Roll over valve assembly 47 includes a guide shaft 42 threaded to the distal end of stem 38. Roll over poppet valve 46 includes a guide tube 43 slidably and axially guided for movement by shaft 42 between a fully open position shown in FIG. 1 to allow fluid communication between the tank interior and chamber 16 and a fully closed position generally shown in FIG. 3 for closing or sealing liquid from the tank interior to chamber 16. Valve 46 can have any suitable shape such as bowed, angled, or flat as shown to seal against flat ridge 44 as described below.

Assembly 47 further comprises rocker arm assembly 48 mounted for rotation on pivot pin 50 which is mounted to the lower section of housing 12 and parallel to the tanker longitudinal axis. The upper part 51 of arm 52 supports the weight of poppet valve 46 when the tanker is upright and valve 46 is in the normally open position, i.e. spaced below body part 44. See FIG. 1. Rocker arm 52 also includes a surface 53, preferably a cam surface, for moving poppet 46 upward toward and to its closed position in which it engages ridge 44 to block liquid flow to chamber 16. See FIG. 3. If desired, O-rings or gaskets or other devices (not shown) can be used to provide sealing function between poppet 46 and mid-section 14, however, the arrangement shown in the figures is preferred. Weight 54 is mounted or secured to the opposite end or portion of arm 52 below pin 50. As better seen in FIG. 2, rocker arm 52 can be solid or include a pair of axially spaced sheet-like arms with weight 54 secured therebetween.

It will be understood by one of ordinary skill in the art that the various parts herein disclosed can be made of various suitable standard materials given the part's function disclosed herein. For example, housing 12 can be aluminum or steel or brass, poppet 22 bronze, spring 36 steel, O-rings 26 and 32 plastic or rubber, rocker arms 52 sheet aluminum, weight 54 steel, pin 50 steel, poppet 30 and 46 bronze or steel, shaft 42 bronze, pin 34 steel and washer 36 bronze or steel.

To install, vent valve assembly 10 can be threaded from below into the tank top (not shown) or, preferably, the hatch or manhole fill cover 41 as desired and generally shown in FIG. 3. Gaskets, washers and other devices (not shown) can be used to assure good sealing between the outer portions of assembly 10 and cover 41.

In operation, assembly 10 assumes the position of FIG. 1 when the hatch cover 41 is closed. As the tank is bottom filled with fuel or other volatile liquid, positive pressure builds at the tank top. In response to more than a predetermined tank pressure relative to outside ambient, body 22 and O-ring 26 rise from the top of mid-section 14 allowing vapor to escape from the tank top through chambers 19, 16 and 17 which action reduces the tank pressure until it falls below the predetermined value in response to which body 22 and O-ring 26 re-seat and re-seal on mid-section 14. Note the entire sub-assembly 18 moved upward and downward during this action including poppet 30, which remained closed, shaft 42, stem 38, spring 36 and washer 35. Poppet 46 remained stationary. Shaft 42 simply telescoped within tube 43.

Once the tank is filled, the above venting action would be repeated in response to build up of excess vapor pressure due to, for example, the rise of tank and cargo temperature. Upon reaching its destination, the tank cargo can be, preferably, bottom unloaded. Vapor recovery systems are usually employed to tend to equalize or stabilize the tanker tank pressure. However, if negative tank pressure falls below a predetermined minimum, poppet valve 30 opens downward against spring 36 away from O-ring 32 allowing air to flow through chamber 17, vents 24, chamber 28, chamber 16, chamber 19 to the tank top interior. Once the negative tank pressure rises above the predetermined minimum, spring 36 draws stem 38 upward to close poppet 30 against O-ring 32. Note body 22 and O-ring 26 remained closed or sealed against section 14, and tube 43 simply telescoped within shaft 42 during this action. Negative tank pressure can result from other factors as well, such as a drop in tank and cargo temperature, causing the above action.

While the tanker is stationary, rocker arm assembly and poppet 46 remain in the position shown in FIG. 1. During normal transport, the weight 54 tends to rotate arm 52 slightly in response to turning accelerations and road banking angles. However, these slight rotations are short in duration and generally are usually insufficient to completely close poppet 46. Once the tanker rights itself, for example coming off a banked curve, the assembly 48 quickly returns to the normally fully open position of FIG. 1.

In the unfortunate event the tanker rolls over, the hatch cover may quickly drop below the liquid level in the tank. As assembly 10 rotates from the FIG. 1 to the FIG. 3 position, weight 54 places an increasing downward force at the end of arm 52 because pin 50 rotates from a position above the center of gravity of weight 54 to one substantially abeam thereof This action causes relative rotation of cam 53 against poppet 46 forcing poppet 46 to close against bottom seat 44 of section 14. Thus the build-up of force vector A causes force vector B to close poppet 46 against seat 44 before tank liquid reaches chamber 16. In addition, once the tanker rolls to, for example, the position with the liquid level shown in FIG. 3, liquid head pressure, arrows C, also places a closing force on the back side of poppet 46. If the tank rolls to near or through 180° from upright, this head pressure, arrows C, exerts a sufficient closing force on valve 46 to contain the liquid regardless of the reduction in force B applied by arm 52.

Note the condition of assembly 18 is not important when assembly 10 is in the rolled position, because poppet 46 isolates chambers 16 and 17 from the tank interior. Note also that if the tanker rolled in the opposite direction, the assembly functions the same with the arm 52 rotated in the opposite angular direction.

Various modifications and changes can be made to the herein disclosed exemplary embodiment without departing from the spirit and scope of the present invention.

What is claimed is:

1. A liquid storage tank normally oriented in an upright position and being capable of rolling over through an angle greater than an angle at which liquid stored the tank can contact the top of the tank interior, said tank comprising:

a venting and roll over shut-off valve assembly mounted at or near the top of the tank and having a passageway communicating between the tank interior and tank exterior and a vent valve subassembly which when in a normally closed position blocks air or vapor communication through said passageway and which moves to at least one open position in response to the tank vapor pressure and exterior tank atmospheric pressure being greater than a predetermined absolute value to permit air or vapor communication through said passageway, and a roll over shut-off valve preventing stored liquid from entering said passageway when the tank rolls more than a predetermined angle from the upright position, said assembly including a housing defining said passageway and said shut-off valve assembly is arranged below said passageway and said subassembly, said shut-off valve assembly including a shut-off valve moveable between a fully open and fully closed position and toward and away from said passageway, and a rocker arm mounted to said housing at a fixed rotation axis for rotation in the tank roll direction between a normal upright open position and a fully closed angular position, said rocker arm having a top portion above the rotation axis for moving said shut-off valve in response to the angular roll of the tank away from the tank upright position.

2. A liquid storage tank as set forth in claim 1, wherein said shut-off valve rests on said rocker arm top portion with the shut-off valve in the fully open position when said tanker and housing are upright, one of said shut-off valve and top portion having a cam surface through which said rocker arm applies a closing force to move said shut-off valve toward the closing position with said passageway.

3. A liquid storage tank as set forth in claim 2 wherein said rocker arm includes a weighted portion spaced below said rotation axis.

4. A liquid storage tank normally oriented in an upright position and being capable of rolling over through an angle greater than an angle at which liquid stored the tank can contact the top of the tank interior, said tank comprising:

a venting and roll over shut-off valve assembly mounted at or near the top of the tank and having a passageway communicating between the tank interior and tank exterior and a vent valve subassembly which when in a normally closed position blocks air or vapor communication through said passageway and which moves to at least one open position in response to the tank vapor pressure and exterior tank atmospheric pressure being greater than a predetermined absolute value to permit air or vapor communication through said passageway, and a roll over shut-off valve preventing stored liquid from entering said passageway when the tank rolls more than a predetermined angle from the upright position, said assembly including a housing defining said passageway and said shut-off valve assembly being arranged below said passageway and said subassembly, said shut-off valve assembly including a shut-off valve moveable between a fully open and fully closed position and toward and away from said passageway, and a rocker arm mounted to said housing for rotation in the tank roll direction between a normal upright open position and a fully closed angular position, said rocker arm having a top portion above the rotation axis for moving said shut-off valve in response to the angular roll of the tank away from the tank upright position, said shut-off valve resting on said rocker arm top portion with the shut-off valve in the fully open position when said tanker and housing are upright, one of said shut-off valve and top portion having a cam surface through which said rocker arm applies a closing force to move said shut-off valve toward the closing position with said passageway, said rocker arm including a weighted portion spaced below the rotation axis, and wherein said housing includes a mid-section defining said passageway and said shut-off valve comprises a poppet which when closed seats against said mid-section.

5. A liquid storage tank as set forth in claim 4 wherein said vent valve subassembly includes an outer valve that seats against said mid-section when in the normally closed position and that moves toward the open position in response to positive tank vapor pressure relative to the ambient being greater than the predetermined value.

6. A liquid storage tank as set forth in claim 5 wherein said outer valve includes a body with at least one vent opening for communicating with said passageway and an inner valve movable between a normally closed position blocking vapor communication through said vent opening and an open position permitting such communication in response to vapor pressure in the tank dropping below a predetermined negative value relative to external ambient pressure.

7. A liquid storage tank as set forth in claim 6 wherein said subassembly includes O-ring seals and one of said outer and inner valves seat against one of said O-ring seals respectively when in the closed position.

8. A liquid storage tank as set forth in claim 6 wherein said vent subassembly includes a spring assembly and stem for biasing said inner valve to its closed position.

9. A liquid storage tank as set forth in claim 8 wherein said vent subassembly includes a guide shaft coupled to said stem for guiding the movement of said shut-off valve between its open and closed positions.

10. A liquid storage tank as set forth in claim 9 wherein said shut-off valve includes a tube for telescoping with said shaft.

11. A liquid storage tank as set forth in claim 6 wherein said outer valve includes legs for telescoping within said passageway.

12. A liquid storage tank as set forth in claim 1, wherein said shut-off valve assembly includes a shut-off valve moveable between a fully open and fully closed position and toward and away from said passageway, and wherein stored liquid contacts said shut-off valve when in the closed position and can apply a further closing force to said shut-off valve in relation to the stored liquid head pressure above said shut-off valve.

13. A venting and roll over shut-off valve assembly for liquid storage tanks that have a normal upright position and that can roll through an angle greater than that required to have stored liquid contact the top of the tank interior and in which vapors from the stored liquid can collect near the top of the tank when in the upright position, comprising:

a housing mountable at or near the top of the tank, said housing having a passageway for the passage of vapors from the tank interior to the tank exterior and for the passage of vapors or air from the tank exterior to the tank interior, a vent valve subassembly in a closed position normally blocking said passageway from passage of vapors or air, said subassembly movable to a first open position permitting vapor flow from the tank interior to the tank exterior in response to a pressure differential between tank interior and tank exterior greater than a predetermined positive value and said subassembly moveable to a second open position permitting vapor or air flow from tank exterior to tank interior in response to a decrease in pressure differential between tank interior and tank exterior below a predetermined negative value, and a roll over shut-off valve preventing stored liquid from entering said passageway when the tank rolls more than a predetermined angle from the upright position, a liquid storage tank normally oriented in an upright position and being capable of rolling over through an angle greater than an angle at which liquid stored the tank can contact the top of the tank interior, said tank comprising:

a venting and roll over shut-off valve assembly mounted at or near the top of the tank and having a passageway communicating between the tank interior and tank exterior and a vent valve subassembly which when in a normally closed position blocks air or vapor communication through said passageway and which moves to at least one open position in response to the tank vapor pressure and exterior tank atmospheric pressure being greater than a predetermined absolute value to permit air or vapor communication through said passageway, and a roll over shut-off valve preventing stored liquid from entering said passageway when the tank rolls more than a predetermined angle from the upright position, said assembly including a housing defining said passageway and said shut-off valve assembly is arranged below said passageway and said subassembly, said shut-off valve assembly includes a shut-off valve moveable between a fully open and fully closed position and toward and away from said passageway, and a rocker arm mounted to said housing at a fixed rotation axis for rotation in the tank roll direction between a normal upright open position and a fully closed angular position, said rocker arm having a top portion above the rotation axis for moving said shut-off valve in response to the angular roll of the tank away from the tank upright position.

14. A liquid storage tank as set forth in claim 13 wherein said vent valve subassembly includes an outer valve that seats against said mid-section when in the normally closed position and that moves toward the open position in response to positive tank vapor pressure relative to the ambient being greater than the predetermined value.

15. A liquid storage tank as set forth in claim 14 wherein said outer valve includes a body with at least one vent opening for communicating with said passageway and an inner valve movable between a normally closed position blocking vapor communication through said vent opening and an open position permitting such communication in response to vapor pressure in the tank dropping below a predetermined negative value relative to external ambient pressure.

16. A liquid storage tank as set forth in claim 15 wherein said subassembly includes O-ring seals and one of said outer and inner valves seat against one of said O-ring seals respectively when in the closed position.

17. A liquid storage tank as set forth in claim 15 wherein said vent subassembly includes a spring assembly and stem for biasing said inner valve to its closed position.

18. A liquid storage tank as set forth in claim 17 wherein said vent subassembly includes a guide shaft coupled to said stem for guiding the movement of said shut-off valve between its open and closed positions.

19. A liquid storage tank as set forth in claim 18 wherein said shut-off valve includes a tube for telescoping with said shaft.

\* \* \* \* \*

UNITED STATES PATENT AND TRADEMARK OFFICE
CERTIFICATE OF CORRECTION

PATENT NO.    : 6,142,167
DATED         : November 7, 2000
INVENTOR(S)   : Martin C. Pettesch It is certified that error appears in the above-identified patent and that said Letters Patent is hereby corrected as shown below:

Claim 13, column 8,
Delete lines 31 - 33
Line 54, change "a" to -- said --.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*